(12) United States Patent
Wagner et al.

(10) Patent No.: US 12,728,546 B2
(45) **Date of Patent: *Sep. 8, 2026**

(54) SYSTEMS AND METHODS FOR PROVIDING DYNAMIC ROBOTIC CONTROL SYSTEMS

(71) Applicant: Berkshire Grey Operating Company, Inc., Bedford, MA (US)

(72) Inventors: Thomas Wagner, Concord, MA (US); Kevin Ahearn, Edenton, NC (US); Matthew T. Mason, Atlanta, GA (US); Christopher Geyer, Arlington, MA (US); Thomas Koletschka, Natick, MA (US); Prasanna Velagapudi, Pittsburgh, PA (US); Michael Dawson-Haggerty, Pittsburgh, PA (US); Siddhartha Srinivasa, Seattle, WA (US); Kyle Maroney, Saunderstown, RI (US); Joseph Romano, Arlington, MA (US); Daniel Carlton Smith, Wexford, PA (US); Gene Temple Price, Somerville, MA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,329

(22) Filed: Oct. 17, 2024

(65) Prior Publication Data

US 2025/0178215 A1 Jun. 5, 2025

Related U.S. Application Data

(63) Continuation of application No. 17/728,049, filed on Apr. 25, 2022, now Pat. No. 12,145,258, which is a (Continued)

(51) Int. Cl.
*B25J 15/06* (2006.01)
*B25J 9/16* (2006.01)

(52) U.S. Cl.
CPC ......... *B25J 15/0616* (2013.01); *B25J 9/1628* (2013.01); *B25J 9/1697* (2013.01)

(58) Field of Classification Search
None
See application file for complete search history.

(56) References Cited

U.S. PATENT DOCUMENTS 4,557,659 A 12/1985 Scaglia
4,604,787 A 8/1986 Silvers, Jr.

(Continued)

FOREIGN PATENT DOCUMENTS

CA 2928645 A1 4/2015
CA 2997280 C 12/2022

(Continued)

OTHER PUBLICATIONS

Hebert et al., A Robotic Gripper System for Limp Material Manipulation: Hardware and Software Development and Integration, Proceedings of the 1997 IEEE International Conference on Robotics and Automation, Albuquerque, Apr. 20-25, 1997, Proceedings of the IEEE International Conference on Robotics and Automation, New York, vol. Conf. 14, Apr. 20, 1997.

(Continued)

*Primary Examiner* — Ryan Rink
(74) *Attorney, Agent, or Firm* — Gesmer Updegrove LLP

(57) ABSTRACT

An articulated arm system is disclosed that includes an articulated arm including an end effector, and a robotic arm control systems including at least one sensor for sensing at least one of the position, movement or acceleration of the articulated arm, and a main controller for providing computational control of the articulated arm, and an on-board (Continued)

controller for providing, responsive to the at least one sensor, a motion signal that directly controls at least a portion of the articulated arm.

20 Claims, 9 Drawing Sheets

Related U.S. Application Data continuation of application No. 16/828,029, filed on Mar. 24, 2020, now Pat. No. 11,370,128, which is a continuation of application No. 15/254,592, filed on Sep. 1, 2016, now Pat. No. 10,647,002.

(60) Provisional application No. 62/221,976, filed on Sep. 22, 2015, provisional application No. 62/212,697, filed on Sep. 1, 2015.

(56) References Cited

U.S. PATENT DOCUMENTS 4,677,778 A 7/1987 Sorimachi et al.
4,786,847 A 11/1988 Daggett et al.
4,896,357 A 1/1990 Hatano et al.
5,764,013 A 6/1998 Yae
5,777,267 A 7/1998 Szydel
5,860,900 A 1/1999 Dunning et al.
5,865,487 A 2/1999 Gore et al.
6,059,092 A 5/2000 Jerue et al.
6,446,175 B1 9/2002 West et al.
6,817,639 B2 11/2004 Schmalz et al.
7,263,890 B2 9/2007 Takahashi
7,313,464 B1 12/2007 Perreault et al.
7,474,939 B2 1/2009 Oda et al.
7,677,622 B2 3/2010 Dunkmann et al.
8,070,203 B2 12/2011 Schaumberger
8,874,270 B2 10/2014 Ando
8,936,291 B2 1/2015 Yasuda et al.
9,061,868 B1 6/2015 Paulsen et al.
9,227,323 B1 1/2016 Konolige et al.
9,259,844 B2 2/2016 Xu et al.
9,266,237 B2 2/2016 Nomura
9,283,680 B2 3/2016 Yasuda et al.
9,486,926 B2 11/2016 Kawano
9,492,923 B2 11/2016 Wellman et al.
9,604,363 B2 3/2017 Ban
9,687,982 B1 6/2017 Jules et al.
9,981,379 B1 5/2018 Youmans et al.
9,999,977 B2 6/2018 Wagner et al.
10,007,827 B2 6/2018 Wagner et al.
10,118,300 B2 11/2018 Wagner et al.
10,315,315 B2 6/2019 Wagner et al.
10,335,956 B2 7/2019 Wagner et al.
10,399,236 B2 9/2019 Wagner et al.
2001/0056313 A1 12/2001 Osborne, Jr.
2002/0068994 A1 6/2002 Hong
2002/0157919 A1 10/2002 Sherwin
2003/0075051 A1 4/2003 Watanabe et al.
2006/0242785 A1* 11/2006 Cawley .................. B65G 47/91 15/321
2010/0040450 A1 2/2010 Parnell
2010/0094461 A1 4/2010 Roth et al.
2010/0101346 A1 4/2010 Johnson et al.
2010/0109360 A1 5/2010 Meisho
2010/0125361 A1 5/2010 Mougin et al.
2010/0175487 A1 7/2010 Sato
2010/0180711 A1* 7/2010 Kilibarda ............. B25J 15/0483 219/136
2010/0234857 A1 9/2010 Itkowitz et al.
2010/0241260 A1 9/2010 Kilibarda et al.
2011/0176148 A1 7/2011 Briggs et al.
2011/0206494 A1 8/2011 Lockie
2011/0243707 A1 10/2011 Dumas et al.
2013/0006417 A1* 1/2013 Sanders .................. H04L 47/13 375/295
2013/0110280 A1 5/2013 Folk
2013/0166061 A1 6/2013 Yamamoto
2013/0218335 A1 8/2013 Barajas et al.
2013/0232919 A1 9/2013 Jaconelli
2013/0245824 A1 9/2013 Barajas et al.
2013/0297046 A1 11/2013 Hendron et al.
2013/0343640 A1 12/2013 Buehler et al.
2013/0345872 A1 12/2013 Brooks et al.
2014/0005831 A1 1/2014 Naderer et al.
2014/0067121 A1 3/2014 Brooks et al.
2014/0067127 A1 3/2014 Gotou
2014/0088763 A1 3/2014 Hazan
2014/0154036 A1 6/2014 Matttern et al.
2014/0200711 A1 7/2014 Douba et al.
2014/0244026 A1 8/2014 Neiser
2014/0298231 A1 10/2014 Saito et al.
2014/0305847 A1 10/2014 Kudrus
2015/0032252 A1 1/2015 Galluzzo et al.
2015/0057793 A1 2/2015 Kawano
2015/0073589 A1 3/2015 Kohodl et al.
2015/0081090 A1 3/2015 Dong
2015/0190925 A1 7/2015 Hoffman et al.
2015/0203340 A1 7/2015 Jacobsen et al.
2015/0224650 A1 8/2015 Xu et al.
2015/0298316 A1 10/2015 Accou et al.
2015/0306770 A1 10/2015 Mittal et al.
2015/0328779 A1 11/2015 Bowman et al.
2015/0346708 A1 12/2015 Mattern et al.
2015/0352721 A1 12/2015 Wicks et al.
2015/0375398 A1 12/2015 Penn et al.
2015/0375401 A1 12/2015 Dunkmann et al.
2016/0031077 A1 2/2016 Inaba et al.
2016/0101526 A1 4/2016 Saito et al.
2016/0136816 A1 5/2016 Pistorino
2016/0167227 A1 6/2016 Wellman et al.
2016/0176043 A1 6/2016 Mishra et al.
2016/0221187 A1 8/2016 Bradski et al.
2016/0243704 A1 8/2016 Vakanski et al.
2016/0271805 A1 9/2016 Kuolt et al.
2016/0347545 A1 12/2016 Lindbo et al.
2017/0021499 A1 1/2017 Wellman et al.
2017/0036354 A1 2/2017 Chavan Dafle et al.
2017/0043953 A1 2/2017 Battles et al.
2017/0050315 A1 2/2017 Henry et al.
2017/0057091 A1 3/2017 Wagner et al.
2017/0080566 A1 3/2017 Stubbs et al.
2017/0080571 A1 3/2017 Wagner et al.
2017/0080579 A1 3/2017 Wagner et al.
2017/0087718 A1 3/2017 Wagner et al.
2017/0087731 A1 3/2017 Wagner et al.
2017/0106532 A1 4/2017 Wellman et al.
2017/0120455 A1 5/2017 Wagner et al.
2017/0121113 A1 5/2017 Wagner et al.
2017/0136632 A1 5/2017 Wagner et al.
2017/0157648 A1 6/2017 Wagner et al.
2017/0197316 A1 7/2017 Wagner et al.
2017/0225330 A1 8/2017 Wagner et al.
2017/0305694 A1 10/2017 McMurrough et al.
2017/0322561 A1 11/2017 Stiernagle
2018/0043527 A1 2/2018 Koga
2018/0127219 A1 5/2018 Wagner et al.
2018/0148272 A1 5/2018 Wagner et al.
2018/0264649 A1 9/2018 Ojima et al.
2018/0265298 A1 9/2018 Wagner et al.
2018/0273295 A1 9/2018 Wagner et al.
2018/0273296 A1 9/2018 Wagner et al.
2018/0273297 A1 9/2018 Wagner et al.
2018/0273298 A1 9/2018 Wagner et al.
2018/0281202 A1 10/2018 Brudniok et al.
2018/0282065 A1 10/2018 Wagner et al.
2018/0282066 A1 10/2018 Wagner et al.
2018/0312336 A1 11/2018 Wagner et al.
2018/0327198 A1 11/2018 Wagner et al.
2018/0330134 A1 11/2018 Wagner et al.
2018/0333749 A1 11/2018 Wagner et al.
2019/0001505 A1 1/2019 Wagner et al.
2019/0329979 A1 10/2019 Wicks et al.

(56) References Cited

U.S. PATENT DOCUMENTS

| | | | |
|---|---|---|---|
| 2020/0223072 | A1 | 7/2020 | Wagner et al. |
| 2022/0241989 | A1 | 8/2022 | Wagner et al. |
| 2023/0286165 | A1 | 9/2023 | Gaisser |

FOREIGN PATENT DOCUMENTS

| | | | |
|---|---|---|---|
| CH | 701886 | A2 | 3/2011 |
| CN | 102540982 | A | 7/2012 |
| CN | 203062791 | U | 7/2013 |
| CN | 103648730 | A | 3/2014 |
| CN | 104137051 | A | 11/2014 |
| CN | 108495738 | A | 9/2018 |
| CN | 114559428 | A | 5/2022 |
| EP | 0317020 | A2 | 5/1989 |
| EP | 0613841 | A1 | 9/1994 |
| EP | 1046458 | A2 | 10/2000 |
| EP | 1256421 | A1 | 11/2002 |
| EP | 1671906 | A1 | 6/2006 |
| EP | 2181814 | A1 | 5/2010 |
| EP | 2960024 | A2 | 12/2015 |
| EP | 3344422 | B1 | 11/2020 |
| EP | 3753687 | B1 | 11/2022 |
| GB | 191009385 | A | 4/1911 |
| WO | 2010034044 | A2 | 4/2010 |
| WO | 2015162390 | A1 | 10/2015 |
| WO | 2016070412 | A1 | 5/2016 |
| WO | 2017040803 | A1 | 3/2017 |
| WO | 2017044632 | A1 | 3/2017 |
| WO | 2018017616 | A1 | 7/2017 |

OTHER PUBLICATIONS

International Preliminary Report on Patentability issued by the International Bureau of WIPO in related International Application No. PCT/US2016/049935 on Mar. 6, 2018, 10 pages.

International Search Report and Written Opinion of the International Searching Authority in related International Application No. PCT/US2016/049935 issued on Nov. 18, 2016, 14 pages.

Liu et al., Hand-arm Coordination for a Tomato Harvesting Robot based on Commercial Manipulator, 2013 IEEE International Conference on Robotics and Biomimetics (ROBIO), IEEE, Dec. 12, 2013.

Moura et al., Neural Network Based Perturbation Identification Approach for High Accuracy Tracking Control of Robotic Manipulators, Proceedings of the International Mechanical Engineering Congress and Exposition, IMECE—ASME, Nov. 1, 2003, pp. 1189-1197.

Vittor et al., A Flexible Robotic Gripper for Automation of Assembly Tasks: A Technology Study on a Gripper for Operation in Shared Human Environments, Assembly and Manufacturing (ISAM), 2011 IEEE International Smposium on, IEEE, May 25, 2011.

* cited by examiner

50
PS1
52
PS2
54
PS3
56
CAM.
58
f/t1
60
f/t2
62
d/d
63
Flow
64
Int.
Control
Signals from
main Robot
Controller
40
Router
2
66
68
70
72
42
M1
44
M2
46
M3
48
Vac.

SYSTEMS AND METHODS FOR PROVIDING DYNAMIC ROBOTIC CONTROL SYSTEMS

PRIORITY

The present application is a continuation of U.S. patent application Ser. No. 17/728,049, filed Apr. 25, 2022, now U.S. Pat. No. 12,145,258, issued Nov. 19, 2024, which is a continuation of U.S. patent application Ser. No. 16/828,029, filed Mar. 24, 2020, now U.S. Pat. No. 11,370,128, issued Jun. 28, 2022, which is a continuation of U.S. patent application Ser. No. 15/254,592, filed Sep. 1, 2016, now U.S. Pat. No. 10,647,002, issued on May 12, 2020, which claims priority to U.S. Provisional Patent Application Ser. No. 62/212,697 filed Sep. 1, 2015 and U.S. Provisional Patent Application Ser. No. 62/221,976 filed Sep. 22, 2015, the disclosures of which are herein incorporated by reference in their entireties.

BACKGROUND

The invention generally relates to robotics, and relates in particular to robotic control systems that are designed to accommodate a wide variety of unexpected conditions and loads.

Most industrial robotic systems operate in a top-down manner, generally as follows: a controller samples a variety of sensors, and then logic on that same controller computes whether or not to take action. The benefit of this logic flow (usually referred to as "polling") is that all of the control logic is in the same place. The disadvantage is that in practical robotic systems, the signals are often sampled quite slowly. Also, all sensors must be wired to the control cabinet leading to long and error-prone cable runs.

A specific example of this traditional architecture would generally be implemented by a legacy robot supplier such as those sold by ABB Robotics, Inc. of Auburn Hills, Michigan, Kuka Roboter GmbH of Germany, Fanuc America Corporation of Rochester Hills, Michigan, or one of their top-tier integrators. All of these suppliers generally encourage the same architecture, and have similar form factors. For example: a welding cell used in an automotive facility might have an ABB IRC5 control cabinet, an ABB IRB2600 1.85 m reach 6 degree of freedom robot, a Miller GMAW welding unit wired over an industrial bus (Devicenet/CANbus) to the IRC5, and an endo-farm tooling package mounting a GMAW torch (e.g., a Tregaskiss Tough Gun). All programming is done on the IRC5, and the end effector has no knowledge of the world, and things like crashes can only be observed or prevented on the IRC5, which is itself quite limited.

Again, in such systems, however, the signals are often sampled relatively slowly and sensors must generally be wired to the control cabinet. There remains a need therefore, for a robotic control system that is able to efficiently and reliably provide dynamic control and responsiveness to conditions in the environment of the robot.

SUMMARY

In accordance with an embodiment, the invention provides an articulated arm system that includes an articulated arm including an end effector, and a robotic arm control system including at least one sensor for sensing at least one of the position, movement or acceleration of the articulated arm, and a main controller for providing computational control of the articulated arm, and an on-board controller for providing, responsive to the at least one sensor, a motion signal that directly controls at least a portion of the articulated arm.

In accordance with another embodiment, the invention provides an articulated arm system including an articulated arm including an end effector, and an articulated arm control system including at least one sensor for sensing at least one of the position, movement or acceleration of the articulated arm, a main controller for providing computational control of the articulated arm, and an on-board controller for providing, responsive to the at least one sensor, a control signal to the main controller.

In accordance with another embodiment, the invention provides a method of providing a control signal to an end effector of an articulated arm. The method includes the steps of providing a main control signal from a main controller to the end effector of the articulated arm, receiving a sensor input signal from at least one sensor positioned proximate the end effector, and at least partially modifying the main control signal responsive to the sensor input signal.

In accordance with a further embodiment, the invention provides a method of providing a control signal to an end effector of an articulated arm. The method includes the steps of providing a main control signal from a main controller to the end effector of the articulated arm, receiving a sensor input signal from a sensor positioned proximate the end effector, and overriding the main control signal responsive to the sensor input signal.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides an architecture for robotic end effectors that allows the end effector to alter the state of the robot. In accordance with certain embodiments, the end effector may observe the environment at a very high frequency and compare local sensor data and observations to a set of formulas or trigger events. This allows for robot-agnostic low latency motion primitive routines, such as for example move until suction and move until force without requiring the full response time of the robotic main controller. A robotic end effector is therefore provided that can alter the state of the robot, and further that may be modified during run time based on a variety of control policies. In accordance with further embodiments, the invention provides a multifaceted gripper design strategy that has also been developed for multimodal gripping without tool changers.

A majority of industrial robotic systems execute their programming logic control in one place only—in the robot controller. The robot controller in these systems is often a large legacy controller with an obscure and (and sometimes poorly featured) programming language. In contrast, the majority of modern and emerging robotic systems contain logic distributed between a robot controller and several workstation computers running a modern operating system and software stack, such as the Ubuntu operating system as sold by Canonical Ltd. of Isle Of Man, the Linux operating system as provided by The Linux Foundation of San Francisco, California and the ROS robotic operating environment as provided by Open Source Robotics Foundation of San Francisco, California.

A positive aspect of these architectures is that they provide tremendous, even arbitrary, amounts of computing power that may be directed towards problems like motion planning, localization, computer vision, etc. The downsides of this architecture are primarily that going through high-level middleware such as ROS adds significant latency, and evaluating a control policy in a loop may see round trip times of well over 100 ms.

As a unifying solution for this problem, a gripper control system has been developed with onboard electronics, sensors, and actuators to which high level logic controlling the system uploads a set of 'triggers' at runtime. These are control policies, such as stop the robot when a force above X Newtons is observed, or when object is observed by depth sensor, slow down the trajectory. The end effector may then evaluate the policy natively at the kHz level, and trigger actions of situations where the gripper should take an action.

Figure 1:
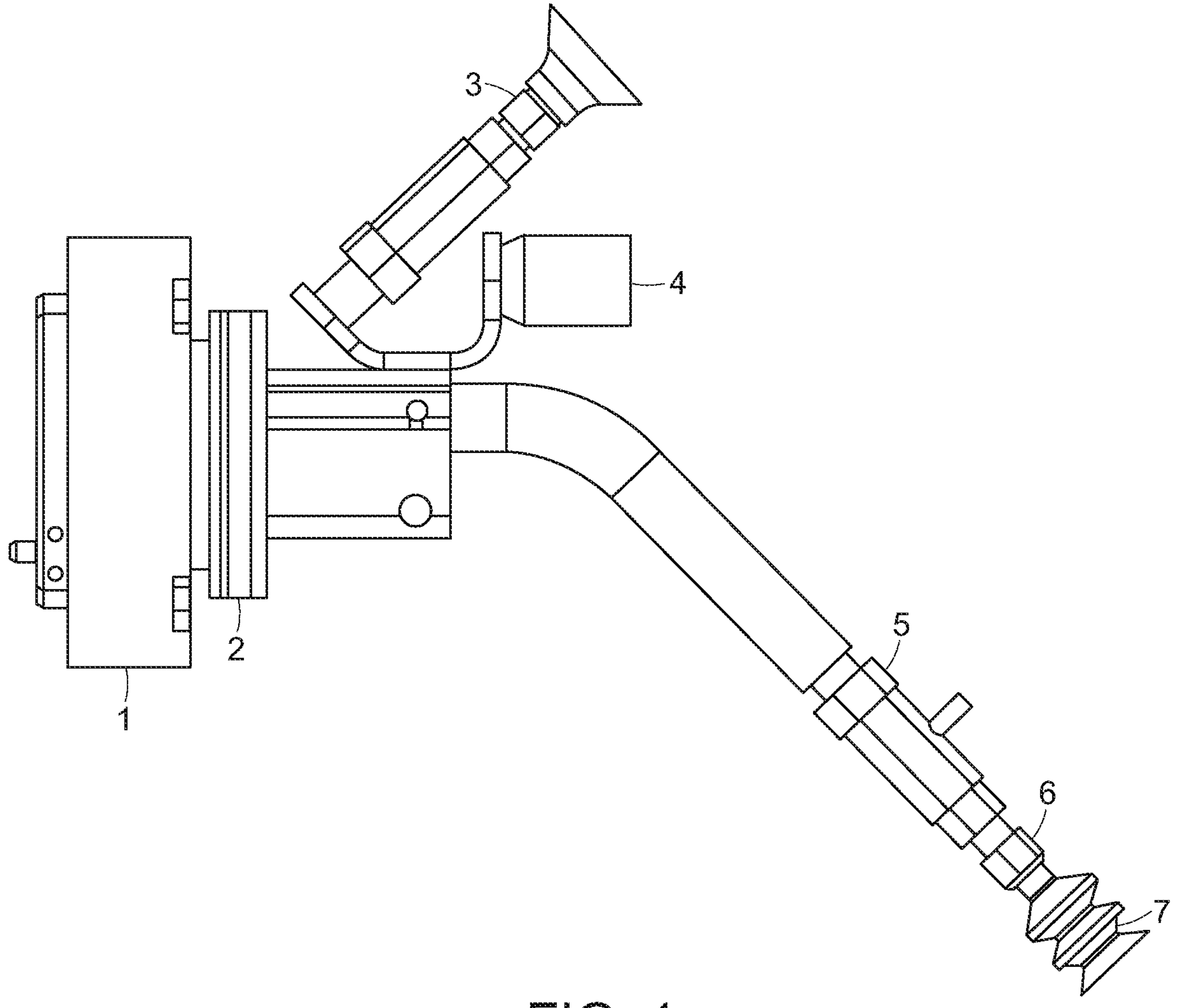
FIG. 1 shows an illustrative diagrammatic view of an end effector used in a robotic system in accordance with an embodiment of the invention.

FIG. 1 shows a portion of an articulated arm assembly that includes a force sensor system 1, on-board control electronics 2, a vacuum end effector 3, a three dimensional depth sensor system 4, an input pressure sensor 5, an output pressure sensor 6, and another vacuum end effector 7. The articulated arm therefore includes on-board control electronics 2 as well as multiple end effectors 3, 7. In certain embodiments, the articulated arm may include a further end effector similar to end effector 3 that is adjacent end effector 3 (and is therefore not shown in FIG. 1).

Figure 2:
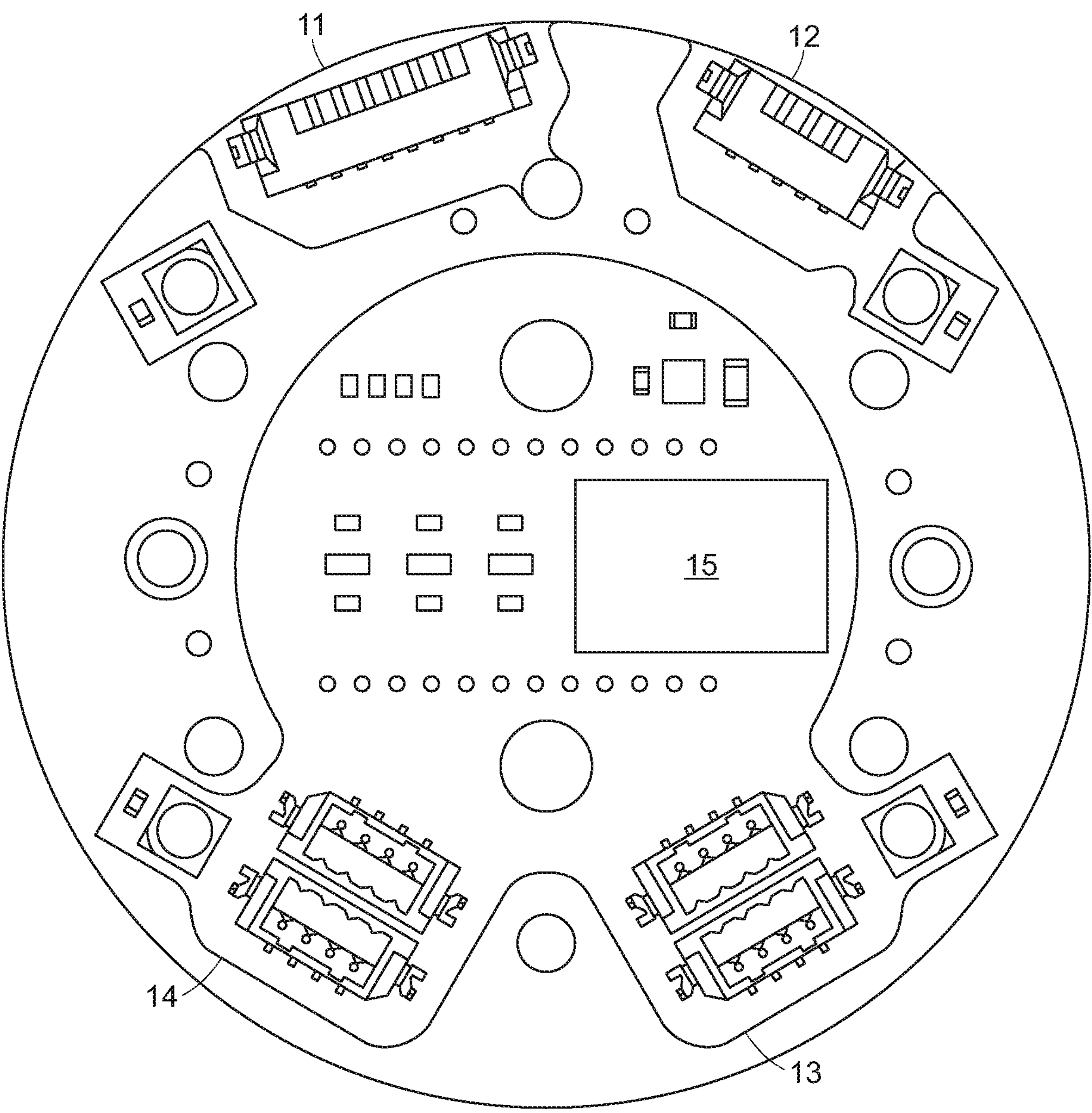
FIG. 2 shows an illustrative diagrammatic view of an on-board controller used in the end effector of FIG. 1.

FIG. 2 shows the on-board control electrics 2, which includes connectors 11 for the force sensors, connectors 12 for the robot, connectors 13 for the pressure sensors, connectors 14 for LEDs such as RGB LEDs, and connector 15 for a microcontroller with serial and wireless connections.

In accordance with an embodiment, the invention provides an articulated arm control system that includes an articulated arm with an end effector, at least one sensor for sensing at least one of the position, movement or acceleration of the articulated arm, a main controller for providing computational control of the articulated arm, and an on-board controller for providing, responsive to the at least one sensor, a control signal to the main controller.

Figure 3:
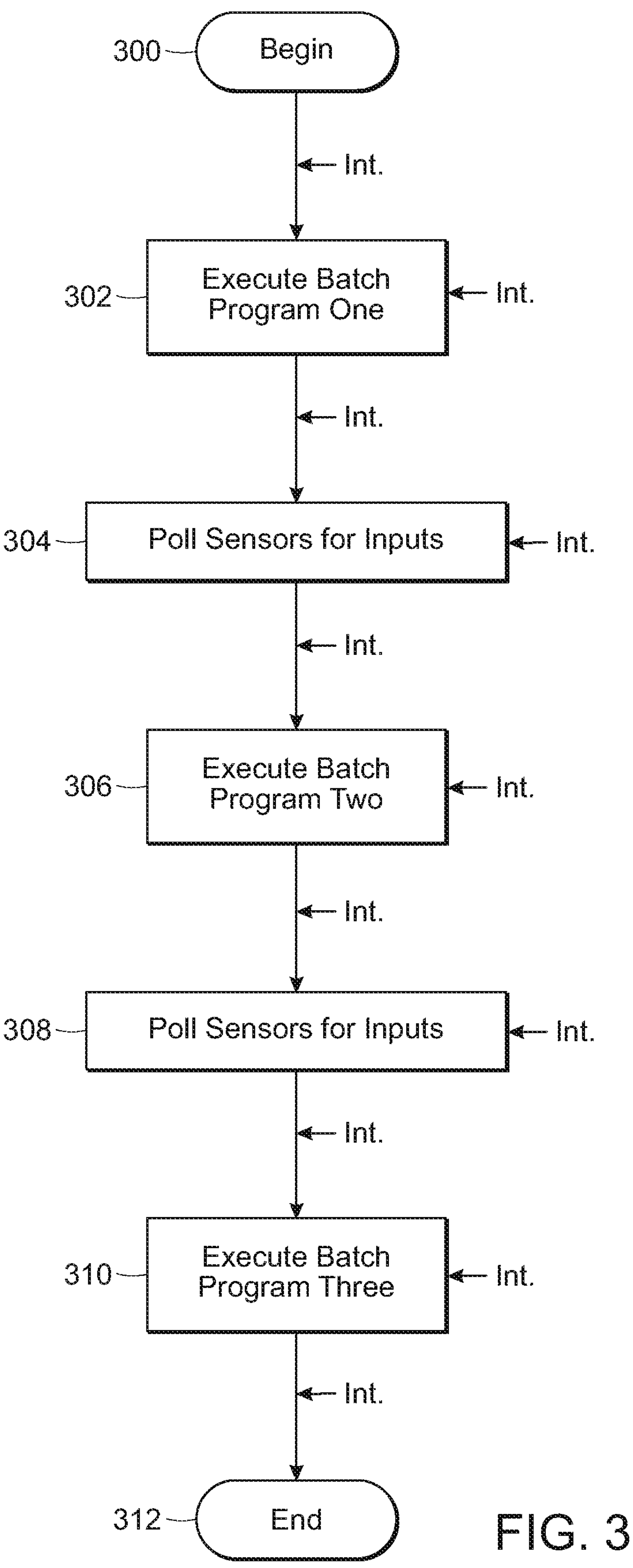
FIG. 3 shows an illustrative diagrammatic view of processing steps used by a robotic control system in accordance with an embodiment of the invention.

FIG. 3 shows, for example, a pre-programmed robot control routine that begins (step 300), executes a first batch program (step 302), polls sensors for inputs (step 304), executes a second batch program (step 306), polls the sensors again for inputs (step 308), executes a third batch program (step 310), and then ends (step 312). If the system is relying on sensor inputs to cause a change in the program (e.g., stop due to readings of a force sensor), the system must wait for that sensor to be polled. In accordance with embodiments of the present invention, on the other hand, interrupt signals may be provided to the main robot controller to cause pre-defined specific responses. As diagrammatically shown in FIG. 3, such interrupt signals may be received any time and immediately processed.

Figure 4:
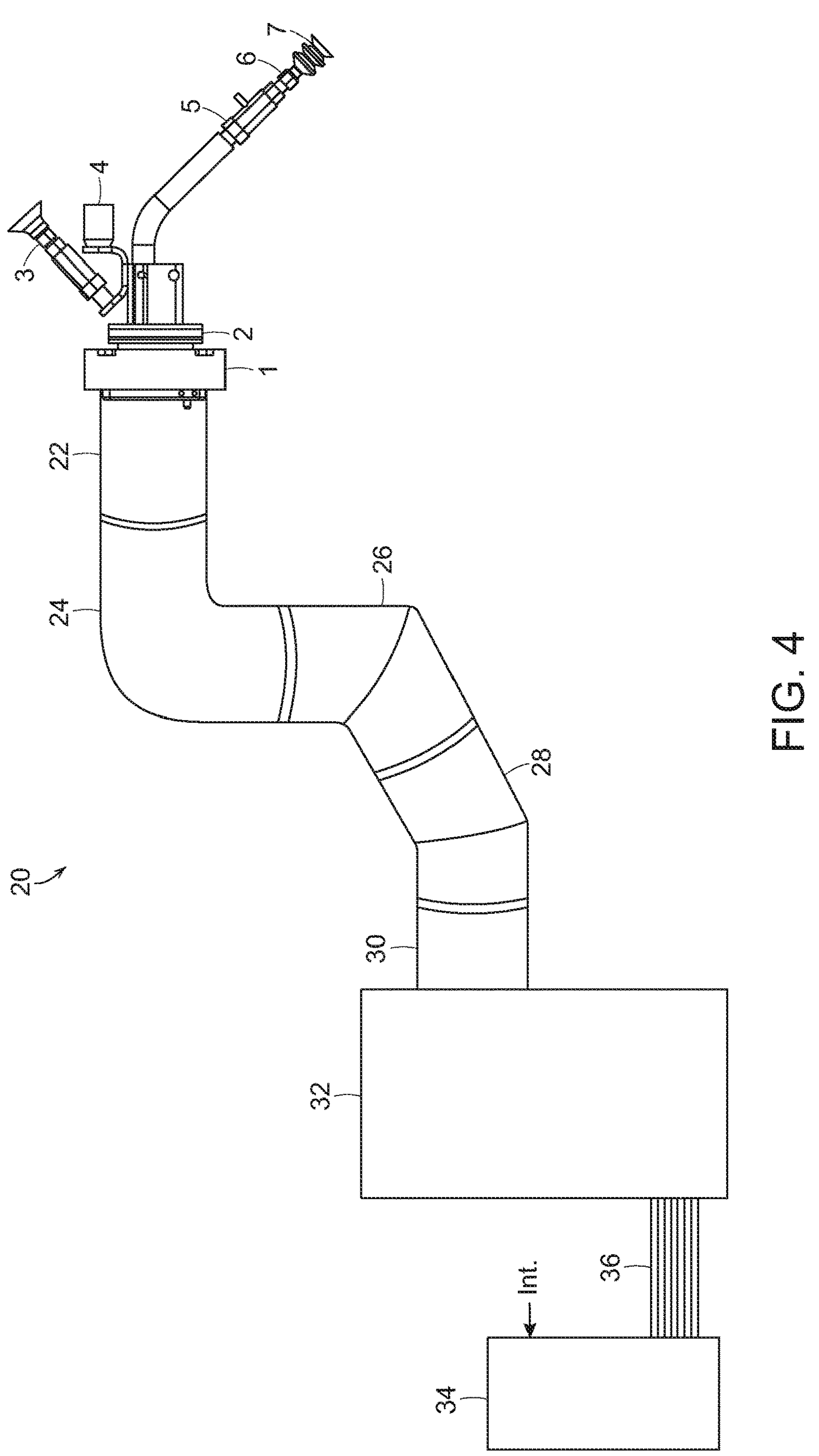
FIG. 4 shows an articulated arm system in accordance with an embodiment of the invention.

FIG. 4 shows a robotic system 20 in accordance with an embodiment of the present invention in which the articulated arm portion of FIG. 1 (including the force sensor system 1, on-board control electronics 2, the vacuum end effector 3, the three dimensional depth sensor system 4, the input pressure sensor 5, the output pressure sensor 6, and the other vacuum end effector 7) is attached to further articulated arm sections 22, 24, 26, 28 and 30. The articulated arm section 30 is attached to a robot base 32, which is coupled to a main robot controller 34 by connector cables 36. An interrupt signal may be provided from the on-board control electronics 2 to the main robot controller 34 either by direct wire connection or wirelessly.

This solution conveys several tremendous advantages: First, one may add the advanced behaviors one generates to any robot, as long as the robot complies with a relatively simple API. Second, one may avoid long cable runs for delicate signals, from the end effector to the robot control box (which is often mounted some distance away from a work cell). Third, one may respond to changes in the environment at the speed of a native control loop, often thousands of times faster than going exclusively through high level logic and middleware. Fourth, one may alter these policies at runtime, switching from move until suction to stop on loss of suction, as well as chaining policies.

In accordance with a further embodiment, the invention provides a method of altering or overriding a control signal from a main controller to an end effector.

Figure 5:
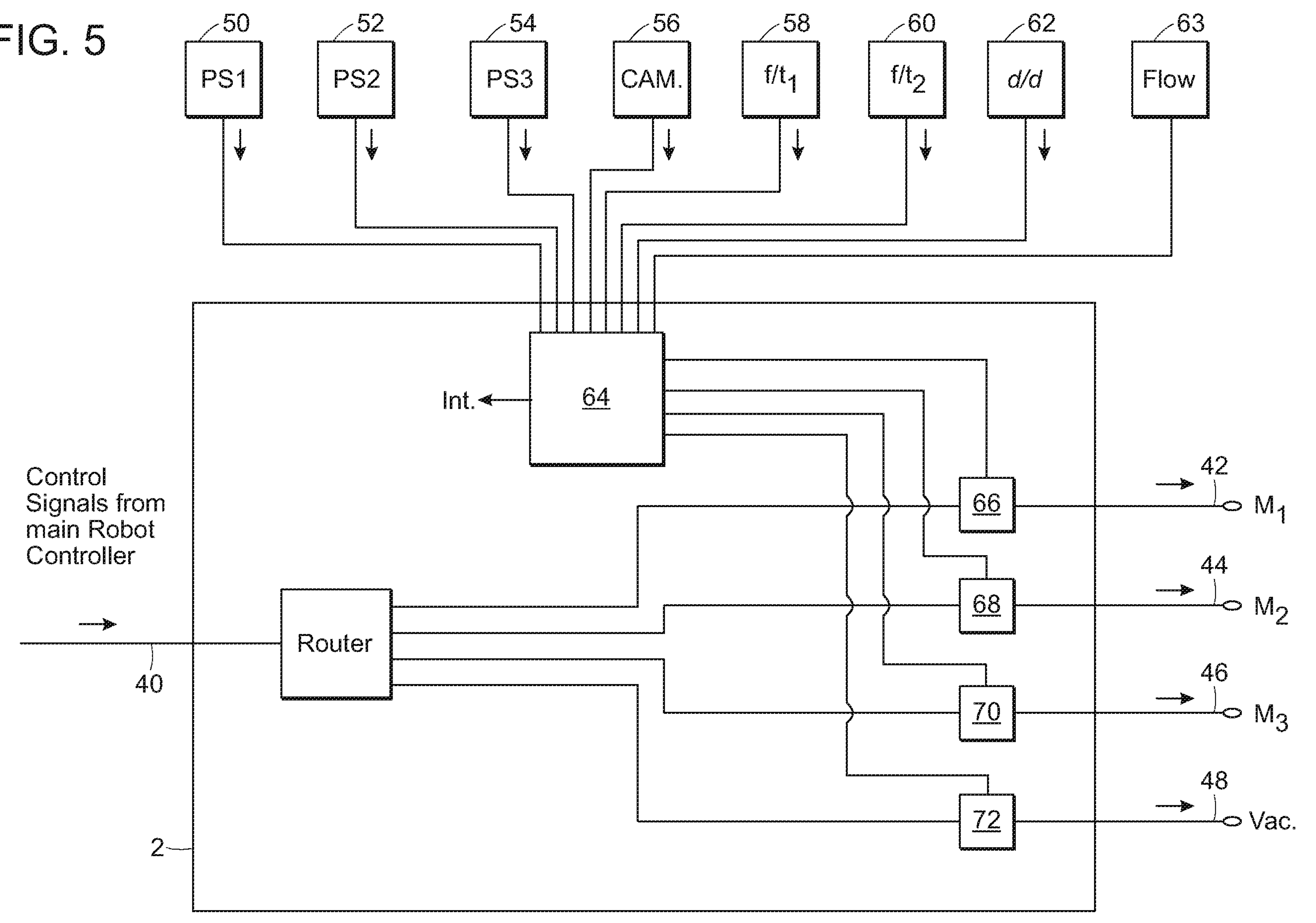
FIG. 5 shows an illustrative block diagram of a robotic control system in accordance with an embodiment of the invention.

FIG. 5, for example, shows an implementation of the on-board control electronics 2. The electronics 2 receives at 40 control signals from the main robot controller 34 (shown in FIG. 4), which causes motors M1, M2, M3 (shown at 42, 44 and 46) and the vacuum (shown at 48) of the articulated arm to move. The motors may control, for example, elbow, wrist and gripper motors of the articulated arm. In the absence of any feedback signals from the environment, the control signals 40 are routed to the appropriate motors for control of the articulated arm in accordance with the program in the main controller.

The electronics 2 however, is also coupled to input sensors including pressure sensors 50, 52 and 54, a camera 56, force/torque sensors 58, 60 deflection/deformation sensor 62 and flow sensor 63. These sensors are coupled to an on-board controller 64 that determines whether to send an interrupt signal to the main robotic controller, and determines whether to immediately take action by overriding any of the output signals to motors M1-M3 and the vacuum. This is achieved by having the on-board controller 64 be coupled to control junctions 66, 68, 70 and 72 in the control paths of the signals 42, 44, 46 and 48.

The robot, for example, may be working in very cluttered, dynamic environments. In order to manipulate objects in these conditions, one needs much more sensing than a typical, more structured, open-loop robotic system would need. The grippers are therefore instrumented with absolute pressure sensors, a 3D RGBD camera, force-torque sensor, and suction cup deflection sensing. By sensing and processing the sensor data directly at the wrist via a microcontroller hardware interrupts may be set (via digital inputs) immediately (hundreds/thousands of Hz). There is much more overhead in the other approach of communicating the sensor data back to the main robotic controller for analysis, which would be significantly slower. This allows one to modify robot motion/execution significantly faster, which in turn allows one to move the robot significantly faster, adapting at speeds not possible otherwise. In these dynamic and unpredictable environments, adapting and providing recovery quickly is vitally important.

The pressure sensors, for example, may provide binary gripping/not gripping, and threshold comparisons (>grip pressure, <required retract pressure, <drop pressure). The pressure sensors may also map material properties/selected grasps to expected pressure readings and in real-time modify trajectory execution (speeds, constraints) in order to ensure successful transportation. The pressure sensors may also provide real-time monitoring of upstream pressure (pressure from source) to ensure expected air pressure available, and modify expected suction measurements from downstream accordingly.

The camera may be an RGBD camera that provides data regarding environment registration, automated localization of expected environment components (conveyor, out shelves, out-bin stack) to remove hand tuning, and expected/unexpected objects/obstacles in the environment and modify trajectory execution accordingly.

The force-torque sensors may provide impulse interrupts. When an unusual or unexpected force or torque is encountered we can stop trajectory execution and recover, where the robot before would have continued its motion in collision with that object causing damage to the object or robot. The force-torque sensors may also provide mass/COM estimates, such as Model Free mass estimates that may inform trajectory execution to slow down as one may be dealing with higher mass and inertias at the endpoint, which are more likely to be dropped due to torqueing off. Model Based mass estimates may also be used to ensure quality of grasp above COM, make sure that the correct item is grasped, that the item is singulated, and that the item is not damaged (unexpected mass).

The deflection/deformation sensor may observe suction cup contact with the environment (typically when one wants to interrupt motion) as the bellows are deflected and have not modified pressure readings, and have not yet displayed a noticeable force impulse. The deflection sensor at its simplest will be used for interrupting motion to avoid robot Force Protective Stops by being that earliest measurement of contact. The deflection/deformation sensor may also measure the floppiness of the picks, which allows one in real-time to again modify trajectory execution, slowing down or constraining the motions to ensure successful transport, or putting it back in the bin if the floppiness is beyond a threshold at which the item may be safely transported.

The flow sensors may detect changes in the amount of airflow as compared to expected air flow values or changes. For example, upon grasping an object, it is expected that the airflow would decrease. Once an object is grasped and is being carried or just held, a sudden increase in air flow may indicate that the grasp has been compromised or that the object has been dropped. The monitoring of weight in combination with air flow may also be employed, particularly when using high flow vacuum systems.

Figure 6A:
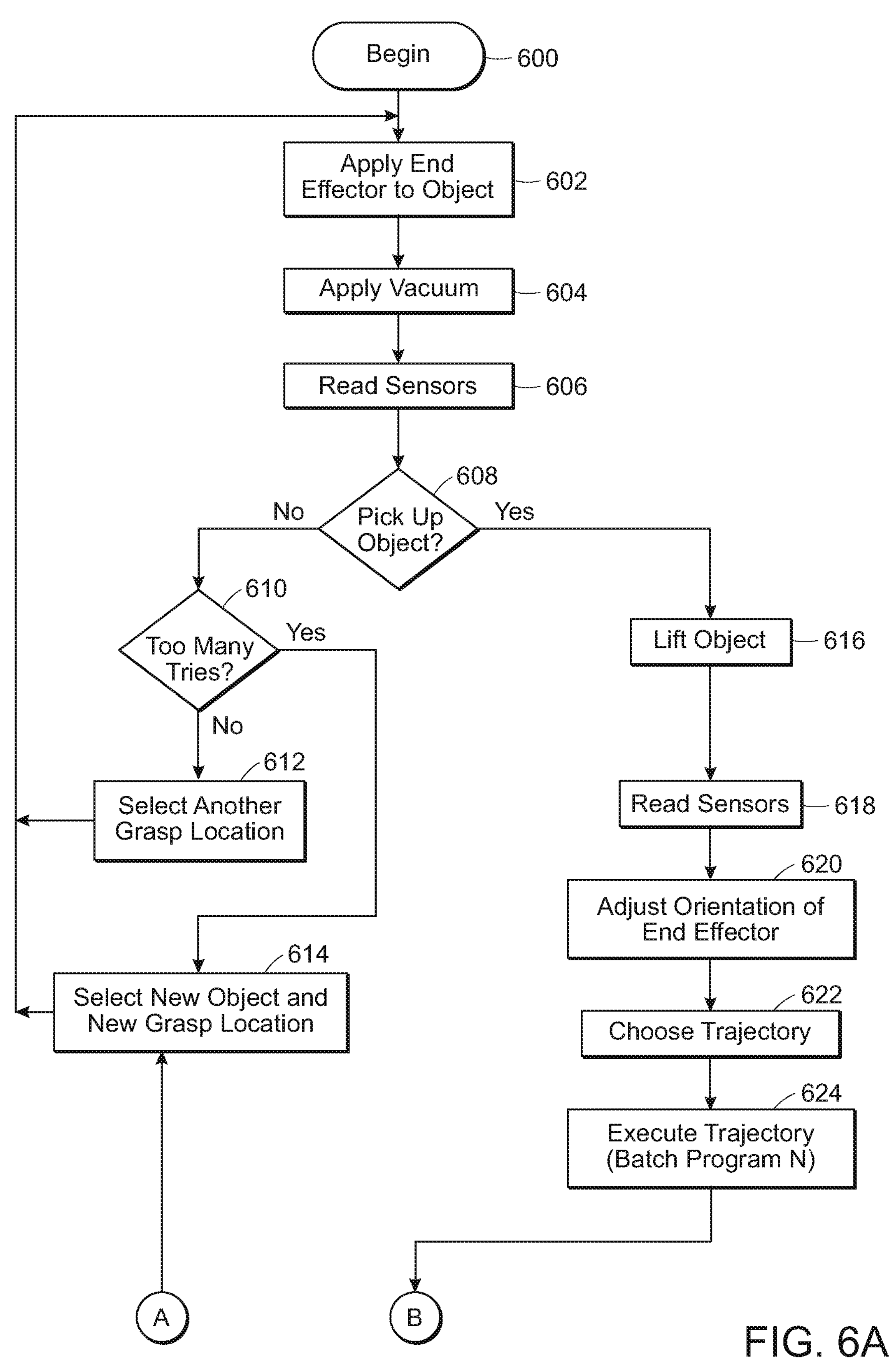
FIGS. 6A and 6B show illustrative diagrammatic views of illustrative processing steps used by the robotic control system of FIG. 5.

With reference to FIG. 6A, the program begins (step 600), by applying the end effector to an object at a selected grasp location (step 602). A vacuum is applied to the end effector (step 604), and the sensors are polled (step 606). Responsive to the sensor inputs, the system determines whether it should try to pick up the object (step 608). For example, if too much vacuum flow is detected, the system may determine that the grasp is insufficient for picking up the object. In this case, the system will determine (step 610) whether there have already been too many tries to pick up this particular object (possibly involving the main controller). If there have not already been too many retries, the system may select another grasp location for the object (step 612) and return to step 602 above. If the system determines that there have already been too many retries, the system will select a new object and a new associated grasp location (step 614) and return to step 602 above.

If the system determines that the object should be picked up (step 608), the system will then lift the object (step 616) and then read the sensors (step 618). If the orientation of the end effector needs to be adjusted, the system adjusts the orientation of the end effector (step 620), for example to cause a heavy object to be held in tension (vertically) by the end effector as opposed to a combination of a vertical and horizontal grasp that would cause a sheer force to be applied. In another example, the system may choose the hold a lighter object with a combination of a vertical and horizontal grasp to accommodate a high speed rotation movement so that when the object is being moved, a centrifugal force will be applied in the direction aligned with the grasp of the object. Once the orientation of the end effector is chosen (step 620), the system will choose a trajectory path (step 622), and then begin execution of the trajectory, e.g., the batch program N (step 624).

Figure 6B:
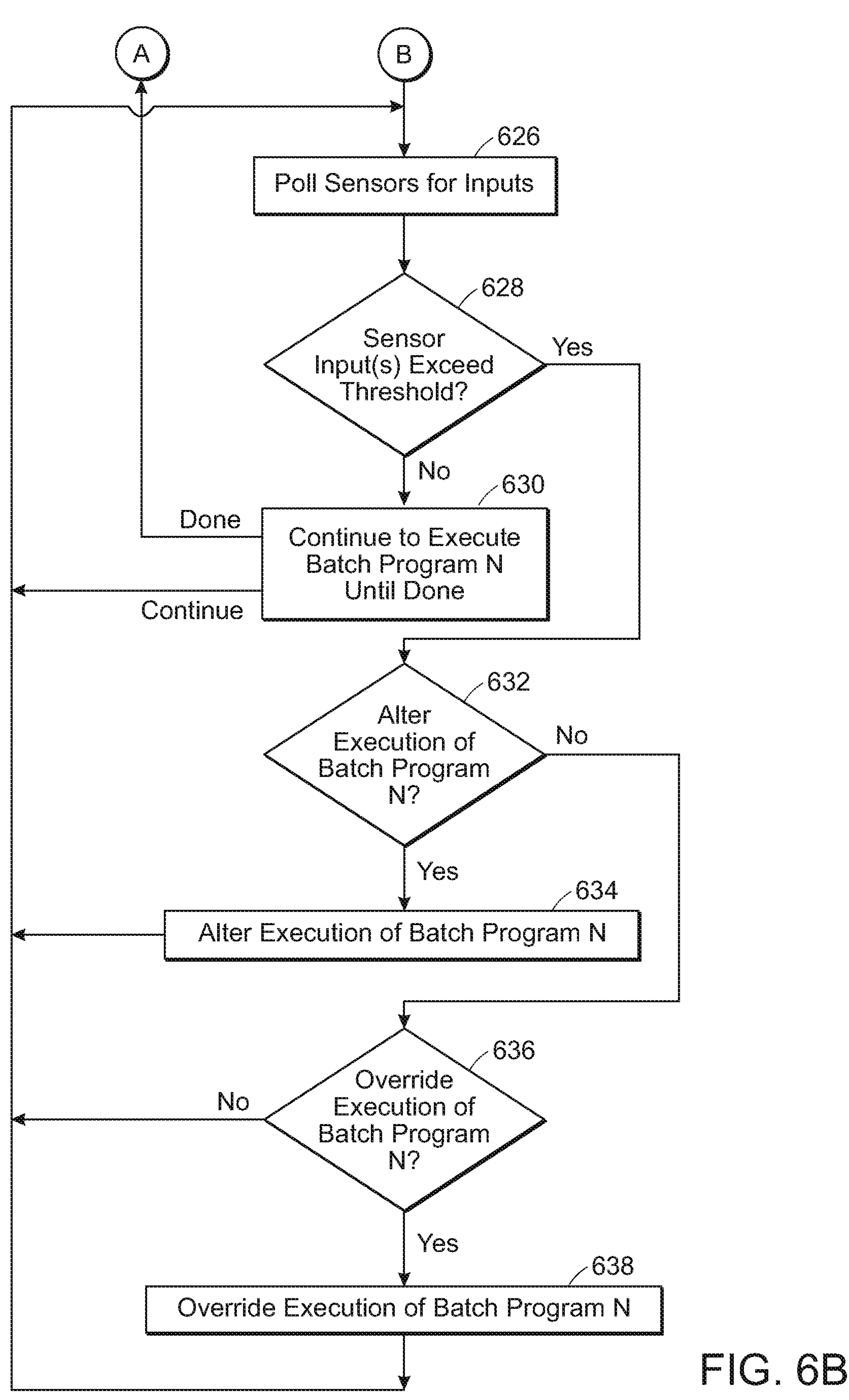

With reference to FIG. 6B, the execution of the batch program N may begin by polling the one or more sensors for inputs (step 626). If none of the inputs exceeds a defined threshold for the main control command (step 628), e.g., to move in a certain vector, then the system will continue to execute the batch program (step 630) until done (whereupon the system returns to step 614). If the batch program is not done, the system returns to step 626, polling the sensor(s) for inputs. If any of the inputs from the sensor(s) do exceed a threshold (step 628), then the system will determine whether the main control command should be altered (e.g., movement slowed or the path changed) (step 632), and if so, the program will so alter the main control command (step 634). If the main control command is not altered, the system will determine whether the main control command should be overridden (step 636), e.g., movement of the end effector should be stopped or the object should be put down for a new grasp attempt, or the object has been dropped, in which case, the system will proceed to pick up a new object and signal for cleaning by a human that an object has been dropped. In any of the exemplary cases, the program will so override the main control command (step 638). In either case, the system then returns to executing the batch program as either altered or overridden, returning to step 626 until done. If the main control signal for a batch program is changed (altered or overwritten), the main controller is also promptly notified.

In accordance with another embodiment, the invention provides an articulated arm control system that includes an articulated arm with an end effector, at least one sensor for sensing at least one of the position, movement or acceleration of the articulated arm, and a main controller for providing computational control of the articulated arm, and an on-board controller for providing, responsive to the at least one sensor, a motion signal that directly controls at least a portion of the articulated arm.

Figure 7:
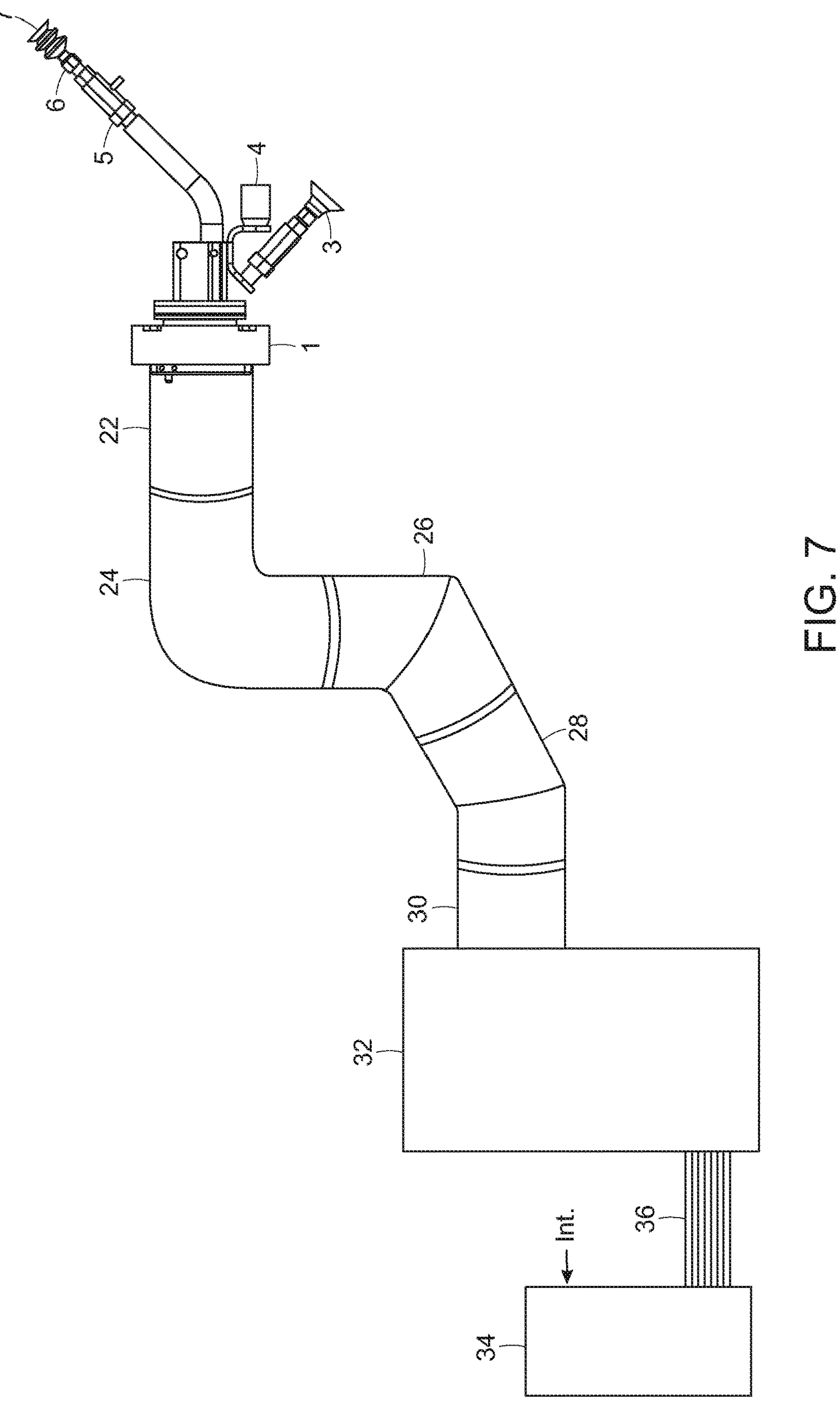
FIG. 7 shows an illustrative diagrammatic view of the articulated arm system of FIG. 4 with the end effector rotated 180 degrees.

FIG. 7, for example shows the robotic system 20 of FIG. 4 except that the articulated arm portion of FIG. 1 is rotated with respect to the articulated arm section 22 such that the vacuum end effector 3 is now positioned to engage the work environment, while the vacuum end effector 7 is moved out of the way.

A unique contribution of the articulated arm is its multiple facets for multimodal gripping, e.g., having multiple grippers packaged on a single end effector in such a way that the robot can use different grippers by orienting the end effector of the robot differently. These facets can be combined in combinations as well as used individually. Other more common approaches are tool changers, which switch a single tool out with a different one on a rack. Multimodal gripping of the present invention reduces cycle time significantly compared to tool changers, as well as being able to combine multiple aspects of a single end effector to pick up unique objects.

The gripper designs in the above embodiments that involved the use of up to three vacuum cups, may be designed specifically for picking items of less than a certain weight, such as 2.2 lbs., out of a clutter of objects, and for grasping and manipulating the bins in which the objects were provided.

The same approach to instrumentation of a vacuum grasping end effector may be applied to any arbitrary configuration of vacuum cups as well. For example, if the robotic system needs to handle boxes such as might be used for shipping of things, then arbitrary N×M arrangements of the suction cells may be created to handle the weight ranges of such packages. FIG. 8A for example shows an end effector 70 that includes a 3 by 3 array of end effector sections 72, each of which includes a vacuum cup 74. Each end effector section 72 may include pressure sensors as discussed above, and each vacuum cup 74 may include a deformation sensor that is able to detect deformation along any of three dimensions. The end effector sections 72 are mounted to a common base 76 that includes a coupling 78 for attachment to an articulated arm.

Figure 8B:
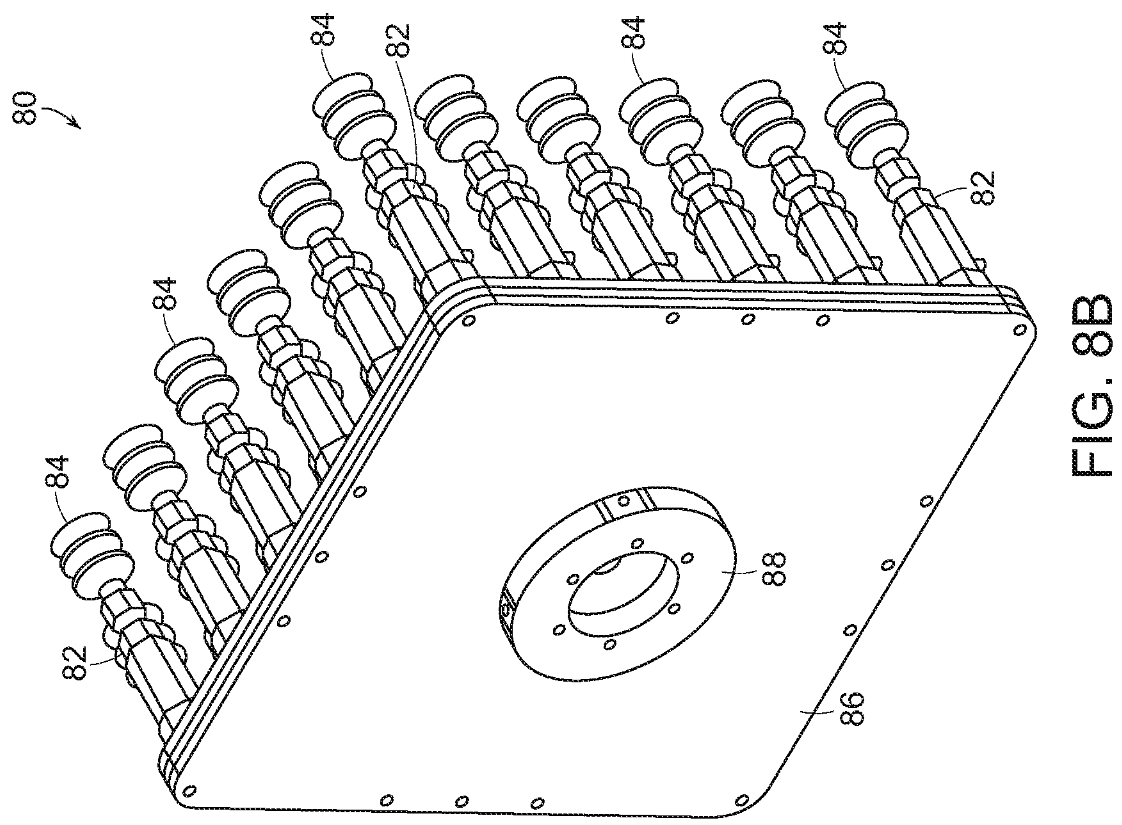
FIGS. 8A and 8B show illustrative diagrammatic views of end effectors for use in further embodiments of the invention.
Figure 8A:
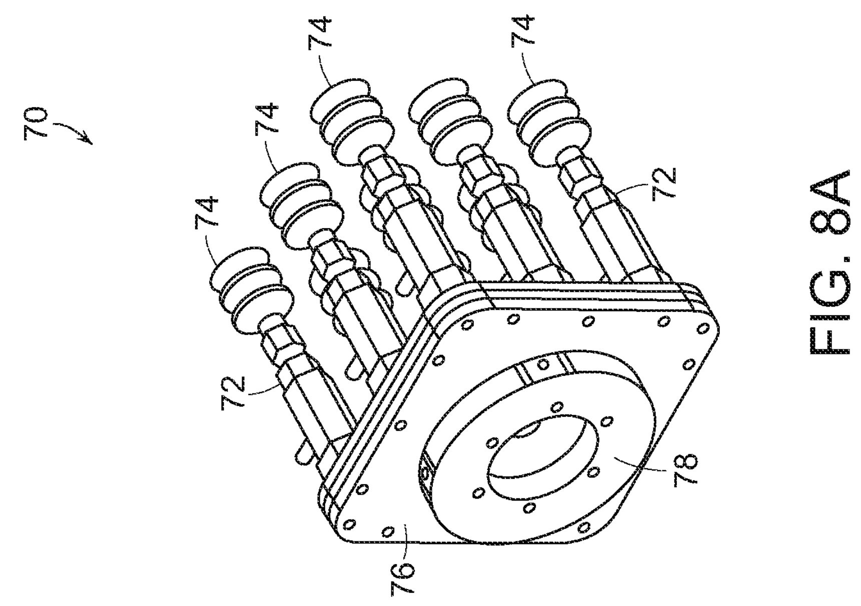

FIG. 8B shows an end effector 80 that includes a 6 by 6 array of end effector sections 82, each of which includes a vacuum cup 84. Again, each end effector section 82 may include pressure sensors as discussed above, and each vacuum cup 84 may include a deformation sensor that is able to detect deformation along any of three dimensions. The end effector sections 82 are mounted to a common base 86 that includes a coupling 88 for attachment to an articulated arm.

The 3×3 array that may, for example, handle up to 19.8 pound packages, and the 6×6 array that may handle up to 79.2 pounds. Such scaling of end effector sections may be made arbitrarily large, and of arbitrary shapes (if, for example, the known objects to be handled are of a particular shape as opposed to generally square/rectangular).

It is significant that by extrapolating the standard vacuum cell to arbitrary sizes/shapes, such an instrumented end effector may be designed for any given object or class of objects that shares all the benefits of such instrumentation as the above embodiments.

Those skilled in the art will appreciate that numerous variations and modifications may be made to the above disclosed embodiments without departing from the spirit and scope of the present invention.

What is claimed is:

1. A robotic arm comprising:

a plurality of arm segments with an articulating joint between adjoining arm segments, each of the articulating joints including a motor configured to move the articulating joint;

a vacuum end effector at a distal end of one of the plurality of arm segments, the vacuum end effector including a vacuum supply controlled by a vacuum control to control a flow of vacuum to the vacuum end effector;

at least one sensor on at least one of the arm segments;

a robotic controller;

an on-board controller coupled to the at least one sensor; and a plurality of control junctions coupling the robotic controller and the on-board controller to the motor of each of the articulating joints and the vacuum control, wherein the robotic controller provides a first control signal to one or more of the control junctions to control at least one of the motor of a corresponding articulating joint and the vacuum control, and wherein the on-board controller uses a signal from the at least one sensor to provide a second control signal to one or more of the control junctions to override the first control signal from the robotic controller to at least one of the motor of the corresponding articulating joint and the vacuum control.

2. The robotic arm as claimed in claim 1, wherein the at least one sensor is a force sensor.

3. The robotic arm as claimed in claim 1, wherein the at least one sensor is a depth sensor.

4. The robotic arm as claimed in claim 1, wherein the at least one sensor is a camera.

5. The robotic arm as claimed in claim 1, further comprising an alternative vacuum end effector and the vacuum control selectively directs the vacuum flow to the alternative vacuum end effector.

6. The robotic arm as claimed in claim 1, wherein the vacuum end effector is an array of end effector sections.

7. The robotic arm as claimed in claim 6, wherein the at least one sensor includes a pressure sensor at each end effector section of the array of end effector sections.

8. A robotic arm comprising:

a plurality of arm segments with an articulating joint between adjoining arm segments, each of the articulating joints including a motor configured to move the articulating joint;

at least one sensor on at least one of the arm segments;

a robotic controller;

an on-board controller coupled to the at least one sensor; and a plurality of control junctions coupling the robotic controller and the on-board controller to the motor of each articulating joint, wherein the robotic controller provides a first motor control signal to the plurality of control junctions to control the motor of each articulating joint, and wherein the on-board controller uses a signal from the at least one sensor to provide a second motor control signal to at least one of the control junctions to override the first motor control signal from the robotic controller to the motor of at least one of the articulating joints.

9. The robotic arm as claimed in claim 8, wherein the at least one sensor is a force sensor.

10. The robotic arm as claimed in claim 8, wherein the at least one sensor is a depth sensor.

11. The robotic arm as claimed in claim 8, wherein the at least one sensor is a camera.

12. The robotic arm as claimed in claim 8, further comprising a vacuum end effector and a vacuum control selectively directs vacuum flow to the vacuum end effector.

13. The robotic arm as claimed in claim 12, wherein the vacuum end effector is an array of end effector sections.

14. The robotic arm as claimed in claim 13, wherein the at least one sensor includes a pressure sensor at each end effector section of the array of end effector sections.

15. A robotic arm comprising:

a remotely located main controller;

a plurality of arm segments with an articulating joint between adjoining arm segments, each of the articulating joints including a motor configured to move the articulating joint;

a vacuum end effector at a distal end of one of the plurality of arm segments, the vacuum end effector including a vacuum supply controlled by a vacuum control to control a flow of vacuum to the vacuum end effector;

at least one sensor on at least one of the arm segments;

an on-board controller coupled to the at least one sensor;

a first control junction coupling the remotely located main controller and the on-board controller to the motor of a corresponding articulating joint; and a second control junction coupling the remotely located main controller and the on-board controller to the vacuum control, wherein the remotely located main controller provides control signals to the first control junction and the second control junction to control the motor of the corresponding articulating joint and the vacuum control, and wherein the on-board controller uses a signal from the at least one sensor to provide different control signals to the first control junction and the second control junction to override the control signals from the remotely located main controller to the motor of the corresponding articulating joint and the vacuum control.

16. The robotic arm as claimed in claim 15, wherein the at least one sensor is a force sensor.

17. The robotic arm as claimed in claim 15, wherein the at least one sensor is a depth sensor.

18. The robotic arm as claimed in claim 15, wherein the at least one sensor is a camera.

19. The robotic arm as claimed in claim 15, further comprising an alternative vacuum end effector and the vacuum control selectively directs the vacuum flow to the alternative vacuum end effector.

20. The robotic arm as claimed in claim 15, wherein the vacuum end effector is an array of end effector sections and the at least one sensor includes a pressure sensor at each end effector section of the array of end effector sections.

* * * * *